Oct. 31, 1944. H. C. IRVIN 2,361,629
BEARING
Filed Feb. 28, 1942 3 Sheets-Sheet 1
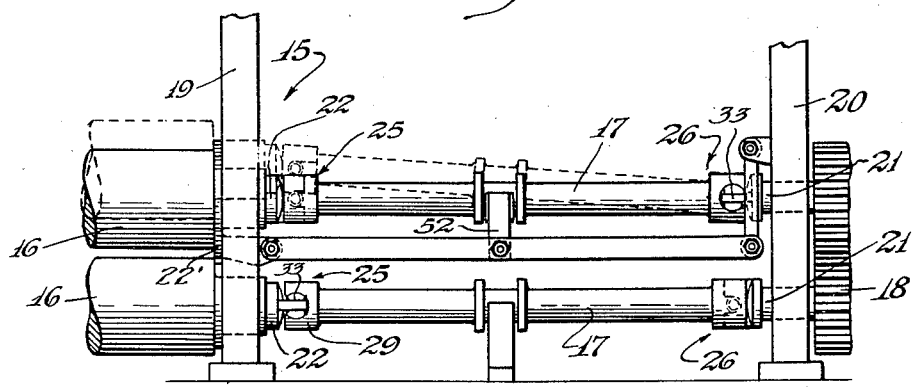
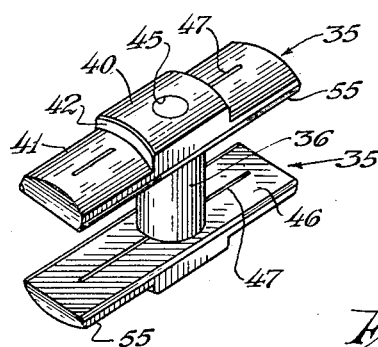
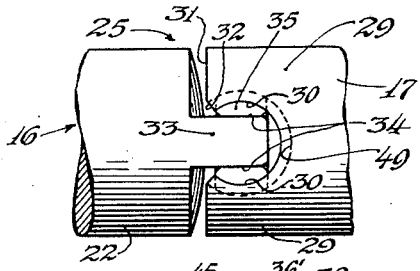
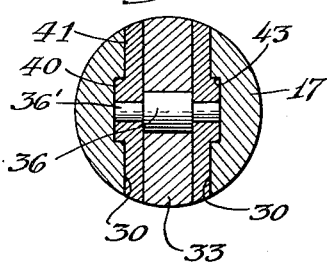
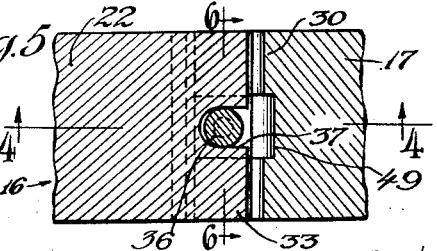
Inventor
Harry C. Irvin
By Wallace and Cannon
Attorneys

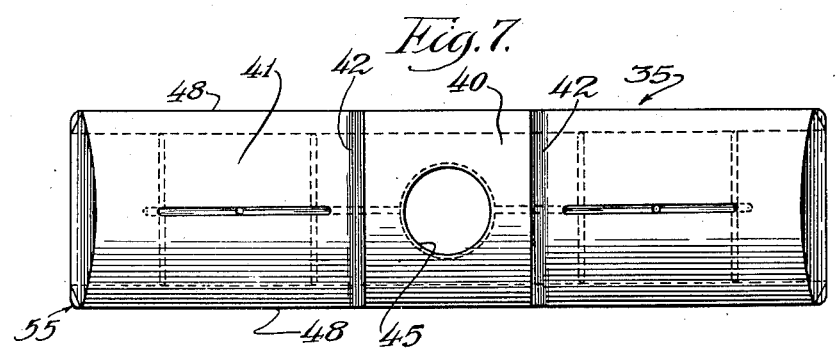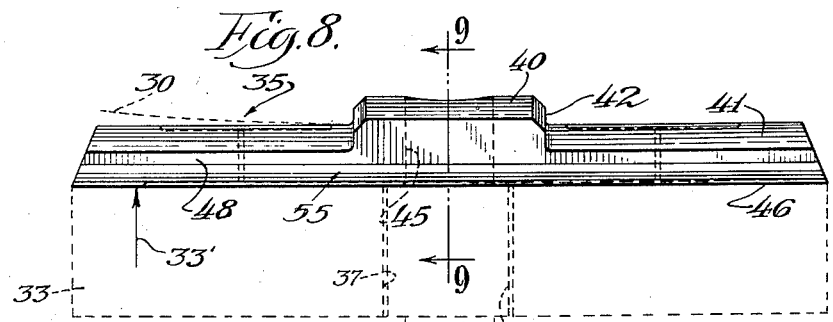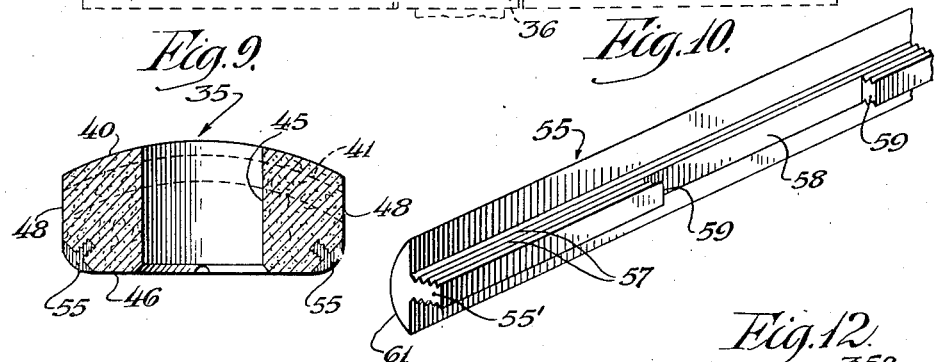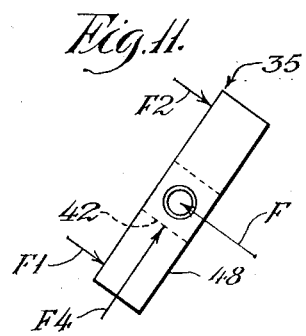

Oct. 31, 1944. H. C. IRVIN 2,361,629
BEARING
Filed Feb. 28, 1942 3 Sheets-Sheet 3
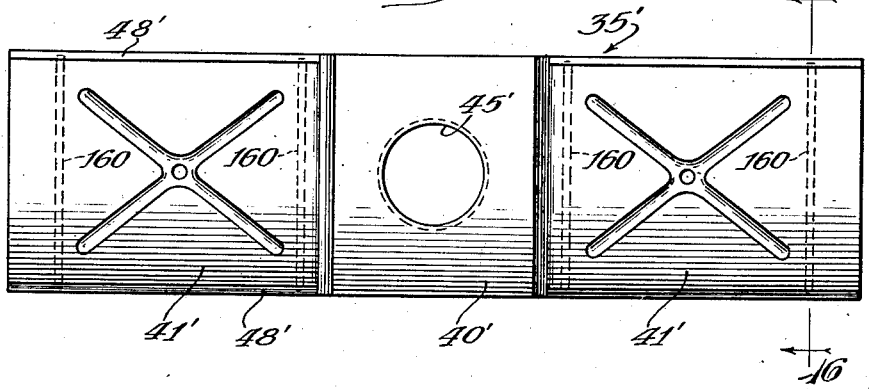
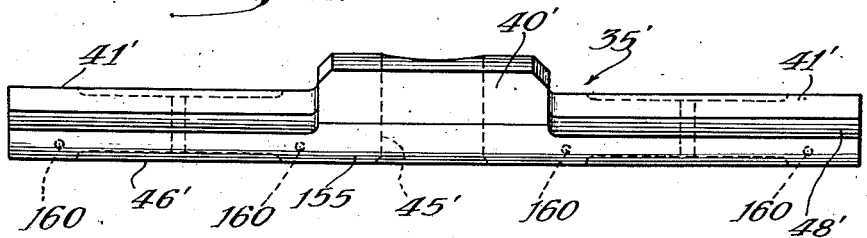
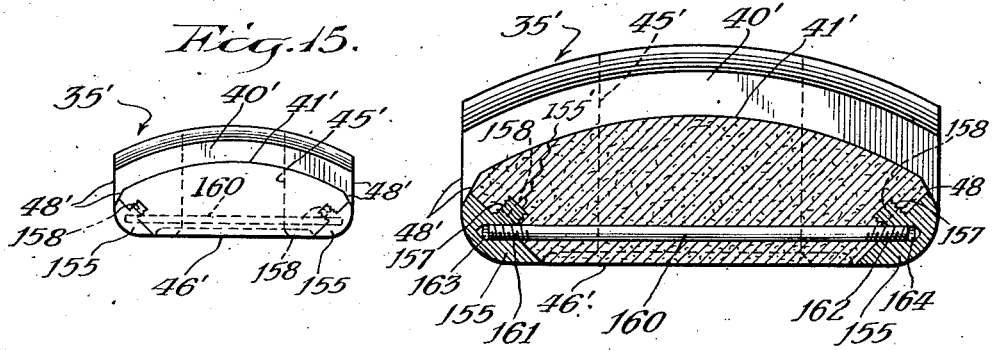
Inventor:
Harry C. Irvin
By Wallace & Cannon
Attorneys Patented Oct. 31, 1944

2,361,629

UNITED STATES PATENT OFFICE 2,361,629

BEARING

Harry C. Irvin, Detroit, Mich., assignor to American Brake Shoe Company, a corporation of Delaware Application February 28, 1942, Serial No. 432,766

20 Claims. (Cl. 64—7)

This application is a continuation in part of my copending application Serial No. 361,475, filed October 17, 1940.

This invention relates to bearings and particularly to what are known as slipper bearings. Bearings of this character are employed in universal joint driving connections and the like such as the driving connections or couplings used between the drive spindles and the rolls in steel rolling mills. Universal joints of the aforesaid character, in common with all universal joints, provide for relative pivoted movement of the two connected members about two intersecting axes disposed at right angles to each other, and also provide for separation of the two members upon relative axial movement thereof.

Customarily one of the members has a bifurcation extending into one end thereof, and aligned recesses are formed in opposed faces of the bifurcation to extend transversely thereacross. Preferably these recesses are of arcuate cross section to afford female arcuate bearing surfaces that lie on the circumference of a circle whose center lies on one of the two axes of the universal joint. The slipper bearing of the present invention comprises a segment of a cylinder having an outer arcuate surface adapted to bear on one of the arcuate bearing surfaces of the bifurcation, and having a flat inner surface. Two such slipper bearings are disposed in the bifurcation with their flat surfaces in opposed spaced relation, and are interconnected and maintained in spaced relation by a spacing or bearing pin having an axis that lies on the other of the axes of the universal joint.

The other of the connected members has a fish-tail or tongue projecting therefrom which includes oppositely facing flat surfaces that are respectively adapted to engage the spaced apart flat surfaces of the slipper bearings. This tongue has a notch or slot extending thereinto from the free end and medially thereof, and which embraces the bearing pin interconnecting the slipper bearings.

Upon variation of alignment of the two connected members, the slipper bearings may move in the female arcuate bearing surfaces, and the tongue may pivot about the bearing pin so as to maintain the driving connection between the two connected members.

Heretofore metallic slipper bearings of the aforesaid character have been employed, but these have been found to produce objectionable wear, particularly of the arcuate female bearing surfaces, which has necessitated frequent inspection to insure that the parts were functioning properly, and which has also entailed frequent reworking or rebuilding of these bearing surfaces.

Hence, among the important objects of this invention is to form slipper bearings of the aforesaid character from a material which will avoid objectionable and rapid wearing away of the female bearing surfaces receiving such slipper bearings; and an object ancillary to the foregoing is to form such slipper bearings from a nonmetallic or composition material embodying desirable wearing properties.

It will be appreciated that slipper bearings of the aforesaid character may be subjected to severe stresses and strains in use, and particularly where they are employed in installations in which appreciable wear has occurred in the parts with which such bearings are to cooperate, and in order to insure that non-metallic or composition bearings may be efficiently used under such circumstances, yet other important objects of this invention are to so reinforce such bearings that they will effectively withstand the stresses and strains impressed thereon during use thereof; to so dispose the reinforcement in the non-metallic or composition slipper bearings that maximum reinforcement of the bearings will be afforded thereby in those portions of the bearing where the need for such reinforcement is greatest; to enable a metallic reinforcement to be utilized in bearings of the aforesaid character by employing metals having desirable wearing properties with respect to the material against which it is to bear; to confine such reinforcement to those portions of the bearings having, at the most, but limited contact with the arcuate bearing surfaces in which the slipper bearings are employed, so as to thereby insure against the reinforcements inducing objectionable wear; and to so locate the reinforcement that detrimental shattering or like disintegration of the non-metallic or composition bearing will be avoided upon damage thereto or failure thereof.

Inasmuch as the edge portions of the slipper bearings will be exposed, particularly during the uniting of the relatively heavy and somewhat unwieldy members to be interconnected by the arrangement of which the slipper bearings are a part, it is advantageous to protect these edges against injury, and so to do is still another object of this invention; and an object ancillary to the foregoing is to afford such protection through the intermediary of the reinforcement included in the bearings.

In the course of a coupling operation, the tongue of the coupling may in many instances strike the edge of a slipper bearing in such a manner and with such a force as to tend to break the bond between the reinforcement and the composition bearing material, and to enable reinforced and protected slipper bearings to withstand such shocks is still a further object of the invention. An object related to the foregoing is to enable a reinforcing means to be so associated with the composition bearing material as to simplify the molding or forming operations involved in the production of the slipper bearings.

Still other objects are to provide a novel slipper bearing of simple and economical construction, and which will be efficient and positive in use.

Other and further objects of the present invention will be apparent from the following description and claims and by reference to the accompanying drawings which, by way of illustration, show preferred embodiments and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

In the drawings,

Fig. 1 is a fragmental elevational view of a portion of a rolling mill equipped with bearings embodying the present invention;

Fig. 2 is a perspective view of a pair of slipper bearings embodying the invention and associated in the manner in which they are mounted in the complete universal coupling;

Fig. 3 is an enlarged fragmental view illustrating one of the universal couplings of Fig. 1;

Fig. 4 is a longitudinal sectional view taken along the longitudinal axis of the two connected shafts or members of Fig. 3 and showing the slipper bearings in cross section at their mid points, the view being taken along the line 4—4 of Fig. 5;

Fig. 5 is a fragmental cross-sectional view taken along the line 5—5 of Fig. 4;

Fig. 6 is a cross-sectional view taken lengthwise of the slipper bearings along the lines 6—6 of Fig. 5;

Fig. 7 is an enlarged view of the convex surface of the slipper bearing of the present invention;

Fig. 8 is a side elevational view of the slipper bearing showing schematically some of the forces which may act on the slipper bearing;

Fig. 9 is a cross-sectional view taken along the line 9—9 of Fig. 8;

Fig. 10 is an enlarged fragmental perspective view illustrating the preferred form of reinforcing element employed in the slipper bearing of the present invention;

Fig. 11 is a schematic view illustrating the forces which are applied to the slipper bearings at certain times in the operation of the universal coupling;

Fig. 12 is a view similar to Fig. 9 and illustrating an embodiment of the invention wherein another type of reinforcing means is applied;

Fig. 13 is a plan view of another embodiment of the invention;

Fig. 14 is a side elevational view of the slipper bearing shown in Fig. 13;

Fig. 15 is an end elevational view of the slipper bearing shown in Figs. 13 and 14; and Fig. 16 is an enlarged transverse sectional view taken along the line 16—16 of Fig. 13.

The preferred form of the invention is illustrated in Fig. 1 of the drawings as incorporated in a portion of a rolling mill 15 having opposed rolls 16 connected to and driven by spindles 17, these spindles 17 being in turn driven by suitable means such as the gearing 18. In the form shown, the rolling mill 15 has two spaced frame members 19 and 20, the gearing 18 being disposed on the outer side of the frame or standard 20 and being fast to stub shafts 21 journaled in bearings in the frame 20. The shafts 21 extend through the frame 20 from the gearing 18 and are operatively connected to the outer ends of the spindles 17, which are located in vertical spaced relation to each other and between the two frame members or standards 19 and 20. The rolls 16 are disposed on the opposite or inner side of the frame member 19 and have integral reduced end portions 22 that project through and are carried by suitable bearings 22', in the frame or standard 19, for connection with the inner ends of the drive spindles 17.

The rolls 16 are customarily employed in the rolling of ingots, blooms, flat sheets, structural sections, and the like, which may vary in thickness and this necessitates variation of the vertical spacing of the spindles, or the vertical positioning of the axes thereof. In such variation or adjustment, the axes of the rolls and their drive spindles are often thrown out of alignment. Therefore, the spindles 17 are connected at their opposite ends to the rolls 16 and the stub shafts 21 by universal couplings 25 and 26 respectively. The universal couplings 25 and 26 are generally similar in form and construction and, therefore, for purposes of disclosure, but one of the universal couplings 25 will be described in detail herein. Since the load or torque to which the universal joints 25 are subjected is relatively great, these universal couplings are provided with bearing means which are of a replaceable character, and by reason of the fact that the couplings must be disconnected quite often in the changing of the rolls 16, these couplings are so constructed as to permit quick detachment or uncoupling of one of the connected members such as the roll 16 from the other of the members such as the spindle 17. In order to provide such a universal coupling, the end of one of the elements or members to be connected is provided with a female coupling element or means which is adapted to be engaged by a male coupling means provided on the other of the two members, and this connection is such that within a predetermined range, the two connected members may swivel with relation to each other about two axes which are disposed at right angles to each other.

Thus, as shown in detail in Figs. 3 to 6 of the drawings, the spindle 17 is constructed to embody the female coupling means, this means comprising a transverse rotative bearing surface means formed in the spindle 17. In providing this bearing surface means, the end of the spindle 17 is bifurcated so as to provide two spaced branches 29 and the opposed faces of these branches are recessed to provide opposed female bearing surfaces 30. The surfaces 30 are preferably arcuate in form and are concentric with respect to an axis which extends transversely of the spindle 17.

This transverse axis upon which the two arcuate bearing surfaces 30 are centered constitutes one of the two axes of the universal joint, and is located relatively close to the end 31 of the spindle 17, so that the open end 32 of the bifurcation defining the branches 29 provides for entry of a fish-tail or tongue 33 between the two branches.

The tongue 33 is formed on and projects from the end of the coupling portion 22 of the roll 16 and extends into the open end 32 into a position between the two arcuate surfaces 30. The opposite faces of the male connecting member or tongue 33 are parallel to each other and provide bearing surfaces 34 one of which is disposed in opposed relation to each of the arcuate surfaces 30. An elongated slipper bearing 35 is interposed between each of the two pairs of opposed surfaces 30 and 34 so that the two connected members 16 and 17 may be rocked relative to each other about the axes of the two arcuate surfaces 30. The two connected members 16 and 17 may also be rocked relative to each other about an axis which is perpendicular to and intersects with the axis of the arcuate surfaces 30. This second axis is provided by means such as a shouldered bearing pin 36 which is connected between the central points of the two slipper bearings 35 and extends through a slot 37 which is formed in the free end and medially of the tongue 33.

The roll or member 16 acts in certain portions of the rotative driving operation to impart a force transversely to the axis of the pin 36 and generally parallel to the axis of the bearing surfaces 30, and the application of such a force would, of course, tend to displace the slipper bearing assembly in an endwise direction with relation to the axis of the bearing surfaces 30. The slipper bearings 35 are therefore interlocked with the member 17 so as to prevent relative endwise displacement of the slipper bearings while permitting the desired rocking movement of the slipper bearings 35 about the axis of the bearing surfaces 30. In the present instance such an interlocking action is provided by an arcuate boss 40 formed on the arcuate face 41 of each slipper bearing 35. This arcuate lug or boss 40 is disposed at the mid-point of the slipper bearing 35 and provides abutment surfaces 42 facing in opposite directions and arranged to engage the sides of a complementary arcuate groove 43 formed in each arcuate bearing surface 30 concentrically with respect to the axis of the bearing surfaces 30. The provision of the arcuate lug or boss 40 at the mid-point of the slipper bearing 35 provides added strength at this point so as to compensate in a measure for a bore 45 formed therein to receive one of the reduced ends 36' of the bearing pin 36.

As hereinbefore pointed out, each slipper bearing 35 has an arcuate surface 41 which constitutes a section of segment of a cylindrical surface having a radius corresponding substantially with the radius of the arcuate bearing surface 30, while on its opposite face each slipper bearing 35 has a flat bearing surface 46 which engages with the opposed bearing surface 34 of the male connecting member 33. If desired, grooves 47 may be provided in each of the bearing surfaces 41 and 46 of the slipper bearing 35 to distribute a suitable lubricant. Thus, it will be clear that each slipper bearing 35 constitutes what may be termed a segment of a cylinder, defined or bounded on its outer surface principally by the arcuate or segmental cylindrical surface 41 and on its inner side by the flat surface 46, and these two inner and outer surfaces are joined by generally radial connecting portions or surfaces 48 which do not function as bearing surfaces in the operation of the coupling 25.

The two connected members, that is, the roll 16 and the spindle 17, are normally made from metal such as steel, and the slipper bearings 35 have heretofore been constructed from metal. The wearing action between the metal surfaces of the slipper bearings 35 and the metal bearing surfaces of the female portion of the universal joint have resulted in objectionable wear of these surfaces, and while the metallic slipper bearings heretofore used have been readily replaceable, the cost of such replacement has been excessive. Moreover, the wear upon the arcuate surfaces 30 of the spindle 17 has been highly objectionable because of the fact that such worn surfaces must be frequently inspected, and repaired by building up of the surfaces and subsequent re-forming and re-finishing in the desired form.

In accordance with the present invention I have enabled the slipper bearings to be formed from a non-metallic or composition bearing material in such a manner that the arcuate bearing surfaces 30 are engaged only by such non-metallic or composition bearing material. The use of such non-metallic or composition bearing material for slipper bearings of this general character has heretofore been quite inefficient in a practical sense by reason of the many problems introduced by the extremely heavy and unwieldly character of the parts which are to be connected, and by the extremely heavy torque loads and resultant bending and breaking stresses which are imposed upon the slipper bearings in universal connections of this character.

In accordance with the present invention the slipper bearings 35 are formed with reinforcing means along the opposite edges of the slipper bearing, and this reinforcing means is of such a character that it tends to resist bending or flexure of the slipper bearing by forces applied thereto both transversely of and parallel to the axis of the pin 36, and in addition the reinforcing means employed in the slipper bearing of the present invention tends to protect the bearing surface 46 against injury during connecting or coupling operations. The problem of preventing such injury to the bearing surface 46 is particularly troublesome in the application of slipper bearings of this character to rolling mills, for in such instances the rolls, such as the rolls 16, are quite heavy and are cumbersome to manipulate. Thus, in the coupling operation the tongue 33 must be inserted into the space between the two flat bearing surfaces 46 while the roll is suspended from a suitable hoist, and it has been found that in such an operation the end of the tongue 33 often tends to scratch or otherwise damage the bearing surfaces 46. The reinforcing means which is employed in the slipper bearing of the present invention also acts to prevent centrifugal discharge of any portion of the slipper bearing in the event that such portion becomes cracked or broken away from the balance or main portion of the slipper bearing.

While many types of non-metallic or composition bearing material may be employed in constructing the slipper bearings of the present invention, I prefer to form the body of the bearings from a composite bearing material comprising a fabric material impregnated with a suitable resin and molded to the desired shape. The body material in either of the three embodiments may be formed from such fabric sheets laid one upon the other so as to form laminations, or the impregnated fabric may be cut or macerated into small pieces which are disposed in the mold in a random arrangement which avoids the laminated effect and yet provides a solid body of composite bearing material. In the manufacture of this bearing material a resin, such as phenol formaldehyde resin, is diluted with alcohol to provide a solution such that the finished molded product will have a specific gravity of approximately 1.340. The fabric is passed through this solution so as to be impregnated or coated. If the macerated form of bearing material is to be employed, the impregnated fabric is then cut up or macerated and arranged in the molds, the reinforcing means being properly disposed within the mold so as to be molded in the desired interlocked relationship to the body of the bearing. The material is then subjected to heat and pressure while in the molds, in the conventional manner. After removal of bearing 35 from the mold, the requisite machining is performed upon the bearing. Such machining may include the formation of the bore 45, while in some instances this bore may be formed in the molding operation.

The reinforcing means which are provided in the slipper bearings of the present invention are disposed along the junctures of the two side surfaces 48 with the flat bearing surface 46, and the functioning of these reinforcing means in imparting strength to the slipper bearing may be best understood from a consideration of Figs. 8 and 11 which illustrate, schematically and in a slightly exaggerated manner, the forces which at times act upon the slipper bearings in such a way as to tend to produce such breakage. Thus, when a roll such as the upper roll 16 of Fig. 1 is so adjusted or positioned that the associated spindle 17 is disposed in an angular or upwardly sloping position, as shown in dotted outline in Fig. 1, this spindle 17 is partially held and guided against longitudinal movement (that is, to the right in Fig. 1) by means of an axial thrust or spindle carrier bearing 52 which is elevated and maintained in its operative relation to the spindle 17 as an incident to the adjustment or setting of the upper roll 16. Hence, in each revolution of the spindle 17, the slipper bearings pass through substantially vertical planes wherein a substantial portion or component of the weight of the upper spindle 17 may act in a downwardly or inclined vertical direction toward the sub shaft 21, and since the pin 36 reacts against the end of the slot 37 in the tongue 33 of the sub shaft 21, this weight tends to exert a breaking force on the slipper bearing.

Theoretically the bearing 52 might serve to maintain the spindle 17 in such a longitudinal position as to avoid the application of such weight or force to the slipper bearing 35. However, such axial thrust bearings 52 are designed principally to carry the vertical component of the load resulting from the weight of the spindle 17, and in practice it is found that inaccuracy and wear of such bearings 52 results in a marked unbalance of the spindle 17 so that a load proportional to this unbalance is applied to the slipper bearings of the pinion-end coupling 26. In Fig. 11 the downward force resulting from this unbalance and acting longitudinally of the spindle 17 is resisted by a force applied to the pin 36, and this resisting force is indicated by the force representing vector F.

The vector F tends to flex the slipper bearing as a simple beam between any points of support afforded by points of bearing contact between the arcuate surface 41 and the opposed arcuate bearing surface 30. Such application of force in opposition to the vector F may vary with conditions of wear in the bearing surfaces 30, but for illustrative purposes, such opposing force may be represented by vectors F1 and F2 which have been indicated adjacent to the opposite ends of the slipper bearing in Fig. 11. In accordance with the present invention the tendency of the vector F to flex or bend the slipper bearing as a simple beam between the points of application of the vectors F1 and F2 is resisted by one of the reinforcing means 55 acting in tension along the edge surface 48 between the points at which the vectors F1 and F2 are applied, and by the other of the reinforcing means 55 acting in compression along the other edge surface 48.

In addition to the forces applied to the slipper bearings in the manner shown in Fig. 11, there are also forces tending to bend the ends of the slipper bearings 35 upwardly in the manner illustrated in Fig. 8. As there shown it will be evident that the female or arcuate bearing surface 30 may, by reason of prior use with metal slipper bearings, be worn by such metal slipper bearings to the form indicated in dotted outline at 30 in Fig. 8. In such instances the principal component of the driving force is exerted adjacent the outer edge of the tongue 33, as indicated at 33' in Fig. 8 so as to bend or flex the slipper bearing 35 into force-transmitting contact with the surface 30 throughout its entire length. In such bending of the bearing 35, the reinforcing means along the junctures of the side surfaces 48 and the bearing surface 46 imparts strength to the non-metallic material of the bearing and thereby reduces the tendency to crack or break. Thus the reinforcing means disposed along the junctures of the side surfaces 48 with the bearing surface 46 enables non-metallic slipper bearings to be safely and satisfactorily employed even though the bearing surfaces 30 with which they cooperate are imperfect or worn.

In order that these reinforcing members 55 may function to protect the slipper bearing 35 against delamination, or other injury, during coupling operations, the members 55 are disposed along the juncture of the surfaces 46 and 48 of the bearing, it being noted in Fig. 9 that the reinforcing members 55 are of such a width, and are so positioned and related to the bearing, that they are spaced from the arcuate surface 41 and do not and cannot exert bearing force upon the arcuate bearing surfaces 30 of the female coupling structure. Hence the reinforcing members 55 impart the requisite strength and afford the desired protection to the non-metallic material while avoiding the undesirable wearing action which has heretofore occurred when metallic slipper bearings have been employed.

As shown in Figs. 9 and 10, the reinforcing members 55 are generally T-shaped in cross-section so that the cross portion of the T provides the desired protection on the outside of the bearing, while the upright of the T forms an anchoring flange 55' which extends into and is interlocked with the moldable material of the bearing 35. This interlocking action is provided by longitudinal flutes or ridges 57 formed along opposite side surfaces of the anchoring flange 55', and by slots 58 formed in the end edge of the flange 55' at a plurality of spaced points along the flange so as to provide a plurality of oppositely facing endwise abutments 59 which interlock with the molded material of the bearing. In Fig. 10, only one such slot 58 is shown, but in practice a plurality of such slots are formed along each flange 55'.

Each reinforcing member 55 preferably has its anchoring flange 55' disposed substantially along the bisector of the angle between the surfaces 46 and 48, so that the arcuate outer surface joins or connects the two surfaces 46 and 48. When thus positioned the reinforcing member provides the desired strength against bending or cracking of the slipper bearing 35, and also functions as a protecting corner bead to prevent delamination of the non-metallic bearing material. The reinforcing members 55 employed in the embodiment of Figs. 1 to 11 are formed from metal so as to resist relatively high bending stresses in the slipper bearing. It will be observed, of course, that a portion of the surface of each reinforcing member 55 must act as a bearing surface against a surface 34 of the tongue, and the reinforcing members 55 are therefore made from a metal such as manganese bronze which has relatively high tensile strength as well as desirable bearing properties with respect to the steel tongues 33.

Since the longitudinal ribs 57 on the mounting flange 55' hold the mounting member against displacement transversely from its interlocked relation, the shoulders 59 thereof are effectively interlocked with the molded material of the slipper bearing 35, and bending forces such as those described in connection with Figs. 8 and 11 are taken with a beam-like action which prevents undue tensile stress in the molded non-metallic material. The interlocking action of the grooves 57 and 58 in the reinforcing members 55 also renders these members operable to prevent centrifugal discharge of the end portions of the bearings 35 in the event that the bearings are broken during use. Hence the parts of such a cracked slipper bearing are held together and in an operative relation to the male and female portions of the coupling, so that such slipper bearings may continue in active service for long periods after such cracking has occurred.

Where the transverse bending load applied to the slipper bearings is relatively slight, as in those instances where the slope of the spindle 17 is slight, the reinforcing means may be formed from fabric as illustrated in Fig. 12 of the drawings. The slipper bearing illustrated in Fig. 12 is indicated at 35a, and may be formed from a resin-base bearing material with either a laminated or macerated fabric, as hereinbefore described, with a strip or sheet 65 of heavy woven fabric molded integrally along the entire length of each side thereof so as to form the junctures between the two side surfaces 48 and the flat bearing surface 46.

The reinforcing fabric strips 65 are unimpregnated, so that they retain their resiliency and tensil strength, and are placed in the mold with the resin-impregnated fabric so that during the hardening of the resin, the rough texture of the unimpregnated fabric strips 65 becomes interlocked with the resin and the impregnated fabric material.

When thus formed, with a continuous end to end reinforcing of heavy fabric material such as the strips 65 molded into the bearing along the junctures of the surface 46 and the connecting surfaces 48, many instances of injury to the surface 46 are avoided; and in particular, these strips 65 prevent delamination, or other similar injury to the bearing material in the event that the tongue 33 strikes the surface 46 adjacent its juncture with the surface 46 during a coupling operation.

The extent or positioning of the reinforcing strips 65 along the entire length of each of the connecting edge surfaces 48 also serves to prevent centrifugal discharge of broken or cracked away parts of the bearing 35a, it being noted that in prior attempts to employ non-metallic slipper bearings it has been found that transverse breakage often occurred at substantially the quarter points, that is, substantially midway between the central bore 45 and the ends of the bearings. Such tendency toward breakage has usually been due to failure to restore or rebuild the female bearing surfaces, as the surfaces 30, after excessive wear caused by the use of metallic slipper bearings. Thus the unimpregnated fabric strips 65, through their positional relation and extent with respect to the body of the slipper bearing, serve to protect the vulnerable surfaces of the bearing, to impart added strength thereto, and to prevent centrifugal discharge of broken pieces of the bearings.

While the interlocking bond afforded in the embodiment illustrated in Figs. 7 to 10 between the composition material and the reinforcing members 55 is sufficiently strong to maintain the desired relationship of the parts under ordinary conditions of use, it has been found that in some instances an unexpected movement of a roll as 16 in the course of a coupling operation may cause the tongue as 33 to strike the edge of a slipper bearing in such a manner or with such force as to break the bond between the composition material and the ribs 57. When this happens the desired protecting and reinforcing action of the members 55 may be impaired to an extent which can be determined only by close inspection of the slipper bearing, with the result that a careful attendant must either incur the time loss incident to such inspection or replace the damaged bearing at once.

In Figs. 13 to 16 of the drawings there is illustrated an alternative embodiment of the invention whereby the slipper bearings are enabled to withstand heavy blows to which they are sometimes subjected, as aforesaid, and in attaining this end the reinforcing members are associated with the molded composition material in such a manner as to facilitate the molding or forming operations involved in the manufacture of the slipper bearings. Thus the slipper bearing 35' shown in Figs. 13 to 16 is in most respects similar to that shown in Figs. 7 to 10, and is formed from molded composition material, such as that employed in the previously described embodiments, so as to provide an arcuate face 41' from which an arcuate boss 40' projects substantially midway between the ends of the bearing. A control bore or aperture 45' is formed in the boss 40' to receive the end of a bearing pin such as the pin 36 illustrated in Figs. 2 and 6, and this aperture extends entirely through the bearing and its opposite flat face 46'. The convex bearing surface 41' and the substantially flat bearing surface 46' are joined by outer connecting surfaces 48', which are generally similar to the surfaces 48 of the other embodiments but are slightly chamfered along the end portions of the bearing, as shown in Figs. 15 and 16.

In this embodiment of the invention, reinforcing and protecting members 155, substantially similar to the reinforcing members 55 of Figs. 6 to 10, are incorporated as corner beads in the composition material along opposite edges of the flat surface 46'. As shown in Figs. 15 and 16, each of these reinforcing members 155 is of substantially the same T-shaped cross sectional form as the members 55, there being an anchoring flange 155' which has longitudinal flutes or ridges 157', and slots such as the slots 158 like those shown in Fig. 10, to interlock with the composition material and provide force transmitting connections therewith. It will be observed that the reinforcing members 155 are so formed and disposed that they terminate short of the convex bearing surface 41', and hence these reinforcing members 155 afford the same reinforcing and protecting action as the members 55 of the other embodiment, while avoiding wear by the reinforcing members 155 on the female bearing surfaces of the coupling.

In the event that an unusually heavy blow on the bearing destroys the bond of the composition material with the ridges 157, the reinforcing members 155 are, in this form of the invention, held in place with the notches or slots 158 properly interlocked with the composition to thereby insure that the reinforcing members will continue to exert an endwise retaining action in respect to separated end portions which may be formed by transverse cracking of the composition material. To this end the two reinforcing strips 155 are interconnected by means which extends through the body of the composition material and holds the two reinforcing members against separating movement. In the form herein shown these connecting means comprise a plurality of tie rods 160 which extend between the reinforcing members 155 at spaced points therealong. The number and location of the tie rods 160 may vary with the size and intended use of the slipper bearings, but in the form herein shown four such tie rods are employed. Two of the tie rods 160 are located on opposite sides of and relatively close to the central bore 45, while the other two of the tie rods 160 are illustrated as being located adjacent to the opposite ends of the slipper bearing.

The tie rods 160 are similar in form and are made of suitable rod stock to provide threads 161 and 162 of opposite lead on the opposite ends thereof. Complemental threaded bores 163 and 164 are formed to receive the oppositely threaded ends of the tie rods 160, and the arrangement is such that when the tie rods 160 have been screwed into the threaded bores 163 and 164 in the two reinforcing members 155, as shown in Fig. 16, these reinforcing members are located in the same spaced apart relationship which they will occupy in the finished slipper bearing. Through this arrangement the molding operations involved in the production of the bearings are materially simplified since the tie rods 160 serve to hold the two reinforcing members 155 in the proper position in the mold. Thus in a molding operation the assembly or unit formed by the two reinforcing members 155 and their tie rods 160 may be put in position in the mold as a unit and it is merely necessary for the worker to make sure that the composition material is properly located beneath and around the several tie rods 160. When the assembly formed by the two reinforcing members 155 and the connecting tie rods 160 has thus been located in the mold, the composition material is subjected to pressure and heat in the usual manner to thereby form the complete slipper bearing. It will be evident that the tie rods 160 hold the reinforcing members 155 against separation, and therefore the slots 158 formed in the anchoring flanges 155' are held in firm engagement with the complemental portions of the composition material even though a severe blow upon the slipper bearing may destroy the bond between the composition material and the ridges 157. Hence the slots 158 serve to hold all portions of the composition material against endwise discharge in the event that the slipper bearing is cracked by excessive bending in use. It will be observed that the tie rods 160 are so located that they are spaced from the bearing surfaces of the composition material, and hence they are firmly interlocked with the composition material, and these tie rods, and particularly the tie rods at the ends of the bearing, therefore serve as means for holding broken sections of the composition material against endwise discharge from the coupling in which the slipper bearing is utilized. In this connection it should be observed that where a sufficient number of tie rods 160 is provided there may be instances where the slots 158 may be eliminated. Moreover, there may be instances where the tie rods 160 also serve the function of the ribs 157, thereby to enable the ribs 157 to be eliminated. In any event it will be evident that the transverse connecting means between the reinforcing members 155 insures that the reinforcing members will accomplish their reinforcing and protecting functions throughout the life of the slipper bearing, even though the bearing may be subjected to unusual blows which might tend to reduce or break the bond between the surfaces of the reinforcing members and the composition material.

It will be evident, therefore, that the present invention enables slipper bearings to be safely and efficiently constructed from a moldable or non-metallic bearing material, thereby to avoid objectionable wear upon the elements of the universal coupling. This strength in the slipper bearing is, in accordance with the present invention, attained in such a manner that the non-metallic bearing material is effectually protected against delamination or other injury during the coupling operations.

While I have illustrated and described selected embodiments of my invention it is to be understood that these are capable of variation and modification and I therefore do not wish to be limited to the precise details set forth but desire to avail myself of such changes and alterations as fall within the purview of the following claims.

I claim:

1. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, and reinforcing means of relatively high tensile strength and disposed as a corner bead along the juncture of said substantially flat surface and at least one of said connecting edge surfaces and so proportioned as to be spaced from said convex surface.

2. A slipper bearing comprising an elongated member formed from molded non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, and reinforcing means comprising strips of untreated woven fabric material molded into said bearing material so as to lie along and about the junctures of said connecting edge surfaces and said flat surface and so proportioned as to be spaced from said convex surface.

3. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, reinforcing means comprising a strip of untreated woven fabric material molded into said bearing material so as to lie only part way in said flat surface and at least one of said connecting edge surfaces along the juncture thereof and extending longitudinally along said connecting edges throughout substantially the entire length thereof, said strip being so proportioned as to be spaced from the convex surface.

4. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, an integral arcuate boss projecting from said convex surface about said opening and providing arcuate shoulders facing toward the ends of said member, and reinforcing means formed from metal and disposed as a corner bead along the juncture of said substantially flat surface and at least one of said connecting edge surfaces and so proportioned as to be spaced from said convex surface.

5. A slipper bearing of the character described comprising an elongated member and formed from a non-metallic bearing material to provide a segmental cylindrical outer bearing surface and a flat inner bearing surface disposed in a first plane perpendicular to a second plane passing through the axis of said segmental cylindrical surface, said second plane substantially bisecting said segmental cylindrical surface, said flat surface and said segmental cylindrical surface being joined at their opposite edges by connecting edge surfaces, said member having an integral arcuate boss projecting from said cylindrical surface substantially midway between the ends of said member, said member having a central bearing opening formed therein centrally through said boss perpendicular to said flat surface, and a pair of metallic reinforcing strips molded in interlocked relation in said member to resist bending of said member and disposed as corner beads along the respective junctures of said substantially flat surface with said edge surfaces, and said strips being so proportioned as to be spaced from said cylindrical surface.

6. A slipper bearing of the character described comprising an elongated member and formed from a non-metallic bearing material to provide a segmental cylindrical outer bearing surface and a flat inner bearing surface disposed in a first plane perpendicular to a second plane passing through the axis of said segmental cylindrical surface, said second plane substantially bisecting said segmental cylindrical surface, said flat surface and said segmental cylindrical surface being joined at their opposite edges by connecting edge surfaces, said member having a central bearing opening formed therein substantially centrally of and perpendicular to said flat surface, and a pair of metallic reinforcing strips formed from a bearing metal and molded in interlocked relation in said member to resist bending of said member and said strips being disposed as corner beads along the respective junctures of said substantially flat surface with said edge surfaces and being so proportioned as to be spaced from said cylindrical surface.

7. A slipper bearing comprising an elongated member having the general form of an elongated segment of a cylinder bounded by a segment of a cylindrical surface and a plane surface lying between said segment of the cylindrical surface and the axis of said cylindrical surface, said member having a bearing opening therein located adjacent its central point and perpendicular to said plane surface, said member being formed from a non-metallic bearing material and having its longitudinal edges formed to provide generally radial outer connecting surfaces between said plane surface and said segment of the cylindrical surface, and reinforcing members formed from a bearing metal having relatively high tensile strength and disposed as corner beads along the junctures of said flat surface and said connecting surfaces in interlocked force transmitting relation to the non-metallic material of said member, said reinforcing members being so proportioned as to be spaced from said cylindrical surface whereby said segment of said cylindrical surface is wholly non-metallic in character.

8. A slipper bearing of the character described comprising an elongated member having the general form of an elongated segment of a cylinder bounded by a segment of a cylindrical surface and a plane surface lying between said segment of the cylindrical surface and the axis of said cylindrical surface, said member having a bearing opening therein located adjacent its central point and perpendicular to said plane surface, said member being formed from a molded non-metallic bearing material and having reinforcing strips of bearing metal disposed along opposite edges of said plane surface and molded in a force transmitting relation to the non-metallic material of said member, said reinforcing strips providing rounded edges merging with said plane surface to protect said plane surface when a connecting element is moved toward engaging relation to said plane surface past said rounded edges.

9. A slipper bearing of the character described comprising an elongated member having the general form of an elongated segment of a cylinder bounded by a segment of a cylindrical surface and a plane surface lying between said segment of the cylindrical surface and the axis of said cylindrical surface, said flat surface and said segmental cylindrical surface being joined at their opposite edges by connecting edge surfaces, said member having a bearing opening therein located adjacent its central point and perpendicular to said plane surface, said member being formed from a molded non-metallic bearing material and having reinforcing strips of bearing metal disposed as corner beads along the junctures of the opposite edges of said plane surface with said edge surfaces and molded in a force transmitting relation to the material of said member in such positions as to be spaced from said segmental cylindrical surface.

10. A slipper bearing of the character described comprising an elongated member having the general form of an elongated segment of a cylinder bounded by a segment of a cylindrical surface and a plane surface lying between said segment of the cylindrical surface and the axis of said cylindrical surface, said member having a bearing opening therein located adjacent its central point and perpendicular to said plane surface, said member being formed from a molded non-metallic bearing material and having its edges formed to provide outer connecting surfaces between said plane surface and said segment of the cylindrical surface, and reinforcing members formed from metal and disposed as corner beads at least in part along the junctures of said outer connecting surfaces and said flat surface and in overlying protecting relation to said connecting surfaces and in interlocked force transmitting relation to the non-metallic material of said member, said reinforcing members being so proportioned as to be spaced from said cylindrical surface whereby said segment of said cylindrical surface is wholly non-metallic in character.

11. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, an integral arcuate boss projecting from said convex surface about said opening and providing arcuate shoulders facing toward the ends of said member, and metallic reinforcing elements along each of said connecting edge surfaces, each of said reinforcing elements being of generally T-shaped cross-section with the upright of the T section extending into said member at an angle to said flat surface and being interlocked with said member, the cross portions of said T sections being disposed along the juncture of said connecting surfaces and said flat surface.

12. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its mid-point, an integral arcuate boss projecting from said convex surface about said opening and providing arcuate shoulders facing toward the ends of said member, and metallic reinforcing elements along each of said connecting edge surfaces, each of said reinforcing elements being of generally T-shaped cross-section with the upright of the T constituting an interlocking flange having abutment surfaces formed thereon molded in interlocked relation to the material of said bearing to prevent both transverse and longitudinal displacement of said reinforcing elements relative to said bearing, and said reinforcing elements being disposed with the cross portion of the T overlying said connecting surfaces at their lines of juncture with said flat surface.

13. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, and metallic reinforcing elements along each of said connecting edge surfaces, each of said reinforcing elements being of generally T-shaped cross-section with the upright of the T section extending into said member at an angle to said flat surface and having longitudinal ribs along its side surfaces and transverse notches in certain of its surfaces interlocked with the non-metallic bearing material of said member, the cross portions of said T sections being disposed along the juncture of said connecting surfaces and said flat surface to protect said flat surface against injury.

14. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, and metallic reinforcing means at least partly embedded in said member and disposed as a corner bead along the juncture of said substantially flat surface and at least one of said connecting edge surfaces and so proportioned as to be spaced from said convex surface.

15. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads along the junctures of said connecting edge surfaces and said substantially flat surface so as to be spaced from said convex surface, and connecting means extending through and in an interlocked relation with respect to said non-metallic material and connecting said reinforcing members to hold the same in position with respect to said non-metallic material.

16. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads along the junctures of said connecting edge surfaces and said substantially flat surface so as to be spaced from said convex surface, and connecting means extending between said reinforcing members and disposed in spaced relation to said convex surface and substantially flat bearing surface and interlocked with said non-metallic material to prevent transverse or longitudinal displacement of said reinforcing members relative to the non-metallic material.

17. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads along the junctures of said connecting edge surfaces and said substantially flat surface so as to be spaced from said convex surface, and a plurality of transverse tie rods spaced from each other and connecting said metallic reinforcing members to interlock said reinforcing members with the non-metallic material and hold the reinforcing members in operative reinforcing relation to said non-metallic material.

18. A slipper bearing comprising an elongated member formed from non-metallic bearing material to provide oppositely facing bearing surfaces, one of said bearing surfaces being flat and the other being convex in the form of a segment of a cylindrical surface, said surfaces being joined by connecting edge surfaces and said member having a bearing opening therein adjacent to its midpoint, metallic reinforcing elements along each of said connecting edge surfaces, each of said reinforcing elements being of generally T-shaped cross-section with the upright of the T section extending into said member at an angle to said flat surface and having longitudinal ribs along its side surfaces and transverse notches in certain of its surfaces interlocked with the non-metallic bearing material of said member, the cross portions of said T sections being disposed along the juncture of said connecting surfaces and said flat surface to protect said flat surface against injury, and a plurality of transverse tie rods spaced from each other and connecting said metallic reinforcing members to interlock said reinforcing members with the non-metallic material and hold the reinforcing members in operative reinforcing relation to said non-metallic material.

19. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads in a predetermined relation along the junctures of said connecting edge surfaces and said substantially flat surface so as to be spaced from said convex surface, and a plurality of spaced metallic connecting members molded in the non-metallic bearing material in spaced relation to said convex and substantially flat surfaces thereby to hold said metallic reinforcing members in said predetermined relation.

20. In a slipper bearing, an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads along the junctures of said connecting edge surfaces and said substantially flat surface so as to be spaced from said convex surface, and a plurality of rigid tie rods spaced from each other and connecting said metallic reinforcing members to form a reinforcing assembly and hold said reinforcing members in predetermined relation, said tie rods being molded in the non-metallic bearing material in spaced relation to said convex and substantially flat surfaces thereof to hold said metallic reinforcing members in their operative reinforcing and protecting relation to said non-metallic material.

HARRY C. IRVIN.